United States Patent
Mooring et al.

(10) Patent No.: US 8,345,414 B2
(45) Date of Patent: Jan. 1, 2013

(54) WEARABLE COMPUTING MODULE

(75) Inventors: David J. Mooring, Los Altos Hills, CA (US); Mark A. Ross, San Carlos, CA (US); Michael F. Gifford, San Jose, CA (US); Troy J. Edwards, San Jose, CA (US); Jason A. Hilbourne, Portland, OR (US)

(73) Assignee: WIMM Labs, Inc., Los Altos, CA (US)

( * ) Notice: Subject to any disclaimer, the term of this patent is extended or adjusted under 35 U.S.C. 154(b) by 202 days.

(21) Appl. No.: 12/905,888

(22) Filed: Oct. 15, 2010

(65) Prior Publication Data
US 2012/0092822 A1 Apr. 19, 2012

(51) Int. Cl.
*G06F 1/16* (2006.01)
(52) U.S. Cl. ........... 361/679.21; 248/441.1; 345/502; 455/619
(58) Field of Classification Search ........... 248/441.1, 248/309.1; 220/222; 345/635, 1.1, 55, 87, 345/173, 8, 502, 156, 633; 455/411, 418, 455/558, 556.1, 575.6, 619; 361/679.03, 361/679.02, 679.46, 679.41, 679.48, 679.43, 361/679.57, 679.32, 679.08, 679.21, 679.26, 361/679.55, 679.27; 439/37; 701/200; 381/364
See application file for complete search history.

(56) References Cited

U.S. PATENT DOCUMENTS

| | | | |
|---|---|---|---|
| 6,249,427 B1* | 6/2001 | Carroll | 361/679.03 |
| 6,654,474 B2 | 11/2003 | Bito | |
| 7,116,940 B2 | 10/2006 | Dvorak | |
| 7,229,385 B2 | 6/2007 | Freeman et al. | |
| 7,398,151 B1 | 7/2008 | Burrell et al. | |
| 7,618,260 B2 | 11/2009 | Daniel et al. | |
| 2005/0035262 A1* | 2/2005 | Seki et al. | 248/441.1 |
| 2008/0047961 A1* | 2/2008 | Liang | 220/222 |
| 2008/0234009 A1 | 9/2008 | Zeiger et al. | |

FOREIGN PATENT DOCUMENTS
WO WO2008008830 1/2008
* cited by examiner

*Primary Examiner* — Hung Duong
(74) *Attorney, Agent, or Firm* — Convergent Law Group LLP

(57) ABSTRACT

In an example embodiment, a computing module includes a case, an optical display subsystem coupled to the case, a circuit element assembly, a power cell and an interface connector. The case includes a bottom portion and multiple lateral sidewalls. The case defines an enclosure. The circuit element assembly is positioned within the enclosure and is coupled to the optical display subsystem. The power cell is coupled to the circuit element assembly. The interface connector is defined in the case and includes multiple side openings, multiple bottom openings and multiple connector pads. The side openings are defined in at least one of the lateral sidewalls. The bottom openings are defined in the bottom portion of the case. The connector pads include multiple side pads coupled to the case and in communication with the side openings and multiple bottom pads coupled to the case and in communication with the bottom openings.

35 Claims, 10 Drawing Sheets

WEARABLE COMPUTING MODULE

BACKGROUND

1. Field of the Invention

The field of the invention relates to wearable devices, and in particular, those capable of wireless communication, "cloud" access, local and remote storage, media playing, application processing, and user configurability.

2. Related Technology

Due in part to their mobile nature, handheld electronic devices are often provided with long-range or short-range wireless communications capabilities. Furthermore, to satisfy consumer demand for small-form factor wireless devices, manufacturers are continually striving to reduce the size and complexity of such devices, while frequently also providing greater functionality.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

In general, example embodiments relate to a wearable computing module.

In an example embodiment, a computing module includes a case, an optical display subsystem coupled to the case, a circuit element assembly, a power cell and an interface connector. The case includes a bottom portion and multiple lateral sidewalls. The case defines an enclosure. The circuit element assembly is positioned within the enclosure and is coupled to the optical display subsystem. The power cell is coupled to the circuit element assembly. The interface connector is defined in the case and includes multiple side openings, multiple bottom openings and multiple connector pads. The side openings are defined in at least one of the lateral sidewalls. The bottom openings are defined in the bottom portion of the case. The connector pads include multiple side pads coupled to the case and in communication with the side openings and multiple bottom pads coupled to the case and in communication with the bottom openings.

In another example embodiment, a computing module includes a case, an optical display subsystem coupled to the case, a circuit element assembly, a power cell and an interface connector. The case includes a bottom portion and multiple lateral sidewalls. The case defines an enclosure. The circuit element assembly is positioned within the enclosure and is coupled to the optical display subsystem. The power cell is coupled to the circuit element assembly. The interface connector is defined in the case and includes multiple side openings defined in at least one of the lateral sidewalls and multiple bottom openings defined in the bottom portion of the case. The optical display subsystem includes an optically transparent cover, an active display coupled to the optically transparent cover, and a radio-transparent portion.

In yet another example embodiment, a wearable computing system includes a computing module and a wearable carrier. The computing module includes a case, an optical display subsystem coupled to the case, a circuit element assembly, a power cell and multiple case engagement features. The case has a bottom portion and multiple lateral sidewalls. The case defines an enclosure. The circuit element assembly is positioned within the enclosure and is coupled to the optical display subsystem. The power cell is coupled to the circuit element assembly. The case engagement features are operatively associated with the case. The wearable carrier includes a body and multiple carrier engagement features. The body defines a carrier recess configured to allow the computing module to be received at least partially therein to removably couple the computing module to the wearable carrier. The carrier engagement features are configured to engage the case engagement features.

In yet another example embodiment, a wearable carrier includes a body defining a carrier recess configured to at least partially receive a computing module so as to removably couple the computing module to the wearable carrier, the body including two opposing base members and two opposing sidewalls interposed between the two opposing base members. The wearable carrier further includes a recess defined in each of the two opposing sidewalls. The wearable carrier further includes a plurality of carrier engagement features configured to engage corresponding computing module engagement features included in the computing module. Each of the carrier engagement features is at least partially disposed in a respective one of the recesses defined in each of the two opposing sidewalls.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

BRIEF DESCRIPTION OF THE DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION OF SOME EXAMPLE EMBODIMENTS

A wearable computing module is provided herein that is adaptable for use with a variety of carriers, which may allow for flexibility in the use of the wearable computing module. In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

As will be discussed in more detail herein, a wearable computing module may include a plurality of stacked components that may allow the computing module to be compact. For example, the wearable computing module may include a multi-functional cage and a tightly integrated set of stacked components, wireless communication components, and other elements, as described in more detail below.

Further, wearable computing modules discussed herein may be configured to provide a convenient level of available network connectedness, as well as the convenience of communicating with and syncing to a set of cloud services and resources. In addition, the compact size of wearable computing modules described herein may allow them to be worn as accessories, with a customizable and pleasing screen display that can emphasize the personal style of the wearer. In one embodiment, the device may conform to a standard size and shape in order to allow the wearable computing module to be easily slipped in and out of a set of one or more available enclosures, such as wrist-bands, while retaining key functionality.

Figure 1A:
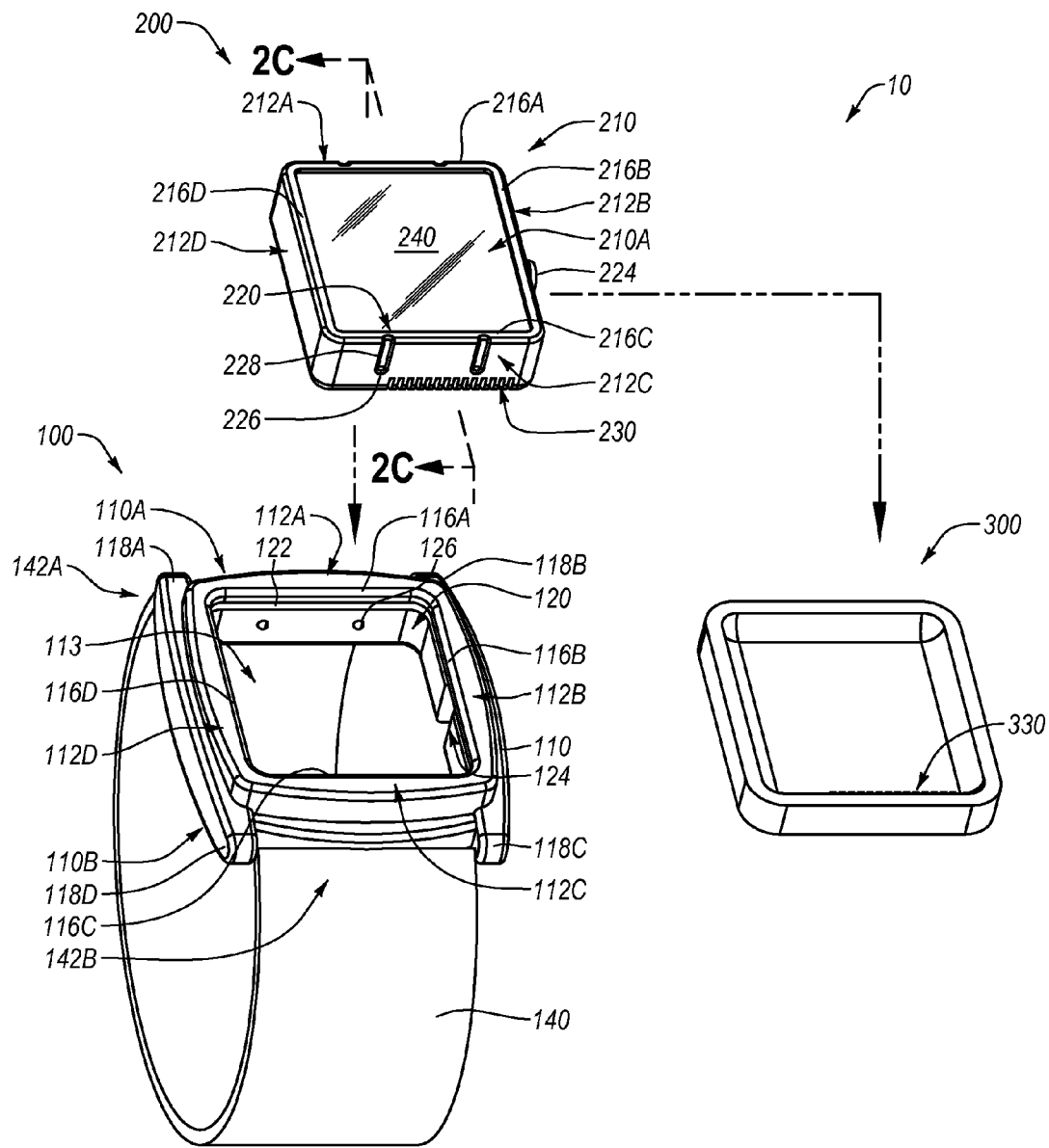
FIG. 1A illustrates a perspective view of a wearable computing module kit including a wearable computing module and a wearable carrier according to one example.

FIG. 1A illustrates a perspective, exploded view of a wearable computing module kit 10 according to one example. The wearable computing module kit 10 may generally include a first carrier, such as a wearable carrier 100 (hereinafter "carrier 100"), a wearable computing module 200 (hereinafter "computing module 200"), and a second carrier, such as a docking station 300. As will be described in more detail below, the computing module 200 may be selectively and removably coupled to the carrier 100 and the docking station 300. Such a configuration allows the computing module 200 to be coupled to the carrier 100, the docking station 300, or other suitable carrier when desired.

In the illustrated example, the carrier 100 generally includes a body 110, a plurality of engagement features, collectively labeled as 120, an optional interface 130 (FIG. 1B), and an optional strap 140 coupled to the body 110. The computing module 200 includes a case 210 configured to be received at least partially within the body 110 of the carrier 100. The computing module 200 also includes engagement features, collectively labeled as 220, configured to engage the engagement features 120 associated with the body 110 to thereby couple the computing module 200 to the carrier 100.

In some examples, when the computing module 200 is coupled to the carrier 100, an interface connector 230 associated with the computing module 200 is in communication with the optional interface 130 (FIG. 1B) associated with the carrier 100. Such a configuration can allow the computing module 200 to interface with components associated with the carrier 100, in the event components are associated with the carrier 100. The interface connector 230 is also configured to couple with interface 330 associated with the docking station 300 to allow the computing module 200 to interface with an external device such as a host computer.

As shown in FIG. 1A, the body 110 generally includes a front portion 110A, a rear portion 110B, and a plurality of perimeter portions 112A-112D defining a carrier recess or cavity 113. The case 210 includes a top portion 210A configured to be positioned within the carrier recess or cavity 113 and a plurality of lateral sidewalls 212A-212D configured to placed in contact or proximity with the perimeter portions 112A-112D, as will now be discussed in more detail.

Figure 1B:
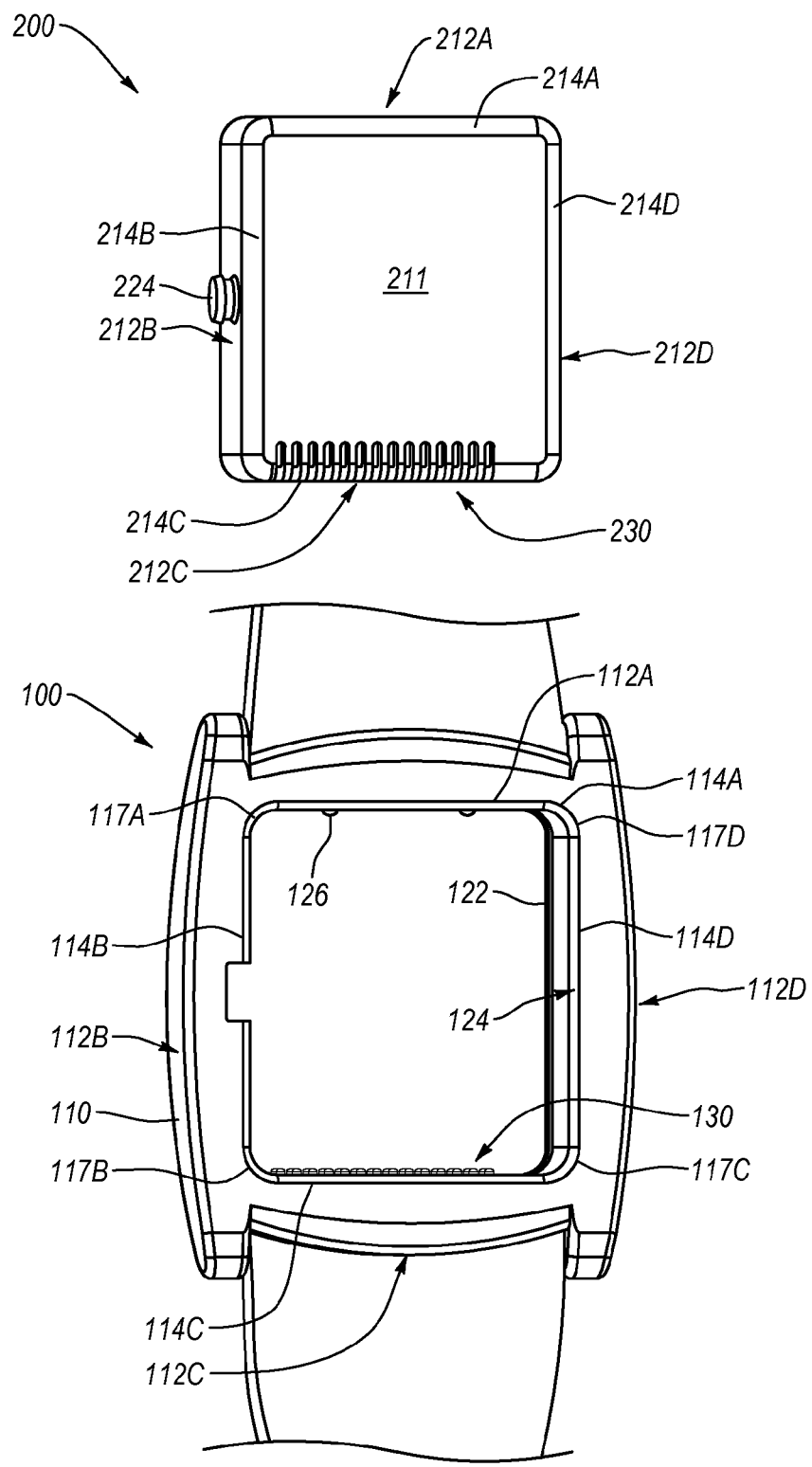
FIG. 1B illustrates a rear view of the wearable computing module and the wearable carrier of FIG. 1A according to one example.

As shown in FIG. 1B, each of the perimeter portions 112A-112D may have a lower edge 114A-114D while as shown in FIG. 1A, each of the perimeter portions 112A-112D also includes an upper edge 116A-116D. Further, as shown in both FIGS. 1A and 1B, corners 117A-117D may be formed at intersections between adjacent perimeter portions 112A-112D. In the illustrated example, the corners 117A-117D may be rounded to provide a smooth transition between the perimeter portions 112A-112D.

As already indicated above, the case 210 generally includes lateral sidewalls 212A-212D configured to be positioned in contact or in proximity with perimeter portions 112A-112D. Referring simultaneously to FIGS. 1A and 1B, when the computing module 200 is inserted into the carrier recess 113, the lateral sidewalls 212A-212D move into contact with the perimeter portions 112A-112D, where lower edges 214A-214D move into proximity with lower edges 114A-114D and upper edges 216A-216D move toward the upper edges 116A-116D. In at least one example, the upper edges 216A-216D may move into contact with engagement features, as will be discussed in more detail at an appropriate location hereinafter. As the case 210 moves into the positions described above, the top portion 210A of the case 210 and a bottom portion 211 (FIG. 1B) of the case 210 may remain exposed through the carrier 100.

Still referring to both FIGS. 1A and 1B, the relative sizes of the perimeter portions 112A-112D and the corresponding lateral sidewalls 212A-212D may be selected to initially constrain orientation of the computing module 200 relative to the carrier 100. For example, the relative sizes of the lower and/or the upper edges 114A-114D, 116A-116D associated with the body 110 as well as corresponding lower and/or upper edges 214A-214D, 216A-216D may be selected so as to constrain orientation of the computing module 200 relative to the carrier 100.

In particular, the lower and/or upper edges 114B, 114D, 116B, 116D associated with perimeter portions 112B, 112D may be longer than the lower and/or upper edges 114A, 114C, 116A, 116C associated with the perimeter portions 112A, 112C. Similarly, the lower and/or upper edges 214B, 214D, 216B, 216D associated with lateral sidewalls 212B, 212D may be longer than the lower and/or upper edges 214A, 214C, 216A, 216C associated with the lateral sidewalls 212A, 212C.

As a result, if the computing module 200 is rotated 90 degrees from the orientation shown in FIGS. 1A-1B, the lateral side walls 212B, 212D would extend beyond the perimeter portion 112A, 112C thereby preventing the computing module 200 from being coupled to the carrier 100 by being at least partially received within carrier recess 113. However, if the computing module 200 is oriented as shown in FIGS. 1A and 1B, the case 210 may be at least partially received within the carrier recess 113 as described. The engagement features 120 described above may further constrain orientation of the computing module 200 relative to the carrier 100 and/or may help maintain the computing module 200 coupled to the carrier 100.

The example engagement features 120 associated with the body 110 may include a ridge 122, a notch 124, and one or more protrusions 126. The example engagement features 220 associated with the case 210 may include a post 224 and detents 226. Exemplary interactions between the engagement features 120, 220 will be described in more detail.

As shown particularly in FIG. 1A, the ridge 122 may be formed adjacent to the front portion 110A of the body 110 and extend inwardly from one or more of the perimeter portions 112A-112D. As also shown in FIG. 1A, the computing module 200 may include an optical display subsystem 240 coupled to the case 210 in such a manner that the optical display sub-system 240 may define a top surface of the computing module 200.

As a result, when the lateral sidewalls 212A-212D are moved into engagement with the perimeter portions 112A-112D, contact between an upper surface of the optical subsystem assembly 240 may prevent the computing module 200 from passing completely through the carrier recess 113. Accordingly, the ridge 122 can help constrain movement of the computing module 200 relative to the carrier 100. Additional features may also help constrain the relative position of the computing module 200 relative to the carrier 100 and/or to help maintain the computing module 200 coupled to the carrier 100 as desired.

In addition to the ridge 122, the carrier 100 also includes notch 124. In the illustrated example, the notch 124 is defined in perimeter portion 112B. The notch 124 is sized to receive a correspondingly sized post 224 associated with lateral sidewall 212B. In operation, the post 224 may be received within the notch 124 as computing module 200 is coupled to the carrier 100. In such a configuration, if the computing module 200 was to be misaligned, such as by rotating the computing module 200 180 degrees from the position shown in FIGS. 1A-1B, interference between the post 224 and perimeter portion 112D would prevent the computing module 200 from being coupled to the carrier 110. Accordingly, the carrier 100 and the computing module 200 may include features that cooperate to help ensure the computing module 200 is positioned at a desired orientation when the computing module 200 is coupled to the carrier 100.

Although the illustrated embodiment includes the notch 124 defined in perimeter portion 112B and the post 224 being associated with lateral sidewall 212D. More generally, the notch 124 can be defined in any perimeter portion 112A, 112B, 112C, or 112D and the post 224 can be associated with any corresponding lateral sidewall 212A, 212B, 212C, or 212D, respectively. Alternately or additionally, the engagement features 120 can include multiple notches 124 defined in multiple perimeter portions 112A-112D while the engagement features 220 can include multiple corresponding posts 224 associated with multiple corresponding lateral sidewalls 212A-212D.

As previously introduced, the engagement features 120 additionally include protrusions 126. In the illustrated example, the protrusions 126 may be ball-type members that are coupled to the perimeter portions 112A, 112C. The protrusions 126 may be configured to engage the detents 226 formed in the case 210, such as in the lateral sidewalls 212A, 212C. According to some embodiments, the protrusions 126 implemented as ball-type members are spring-loaded so as to bias the protrusions 126 outward towards carrier recess 113. In these and other embodiments, the outward biasing of the protrusions 126 causes the protrusions to engage the detents 226.

Optionally, the outward biasing force exerted on each protrusion 126 is provided by a resilient member (not shown) integrated or disposed within the body 110 of carrier 100 behind each protrusion 126. In these and other embodiments, the resilient members may absorb mechanical shock to prevent/reduce damage to the computing module 200 and/or the outward biasing force exerted on the protrusions 126 by the respective resilient members may prevent or reduce rattling noise when the computing module 200 is coupled to the carrier 100.

Figure 1C:
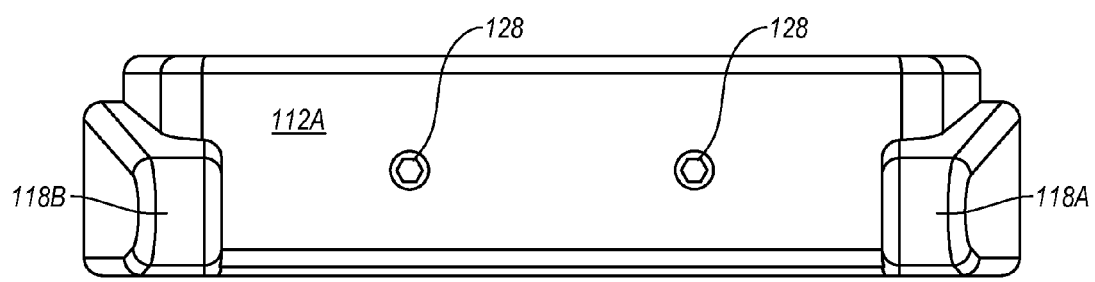
FIG. 1C illustrates an elevation view of a portion of the wearable carrier of FIG. 1A according to an embodiment

Optionally, a plurality of adjustment screws 128 (FIG. 1C) accessible from exterior surfaces of perimeter portions 112A and 112C are provided for adjusting the magnitude of the outward biasing force exerted by the resilient members on the protrusions 126. Alternately or additionally, the protrusions 126, resilient members, and adjustment screws 128 are positioned in perimeter portions 112A, 112C between lugs 118A, 118B and between lugs 118C, 118D formed in the body 110. By positioning the protrusions 126, resilient members, and adjustment screws 128 in perimeter portions 112A, 112C between lugs 118A, 118B and between lugs 118C, 118D, the adjustment screws 128 can be substantially obscured from view by the optional strap 140 having ends 142A, 142B connected between lug pairs 118A-118B and 118C-118D.

According to some embodiments, the protrusions 126 on each respective perimeter portion 112A, 112C are spaced as widely from each other as possible while both remain between a corresponding pair of lugs 118A-118B or 118C-118D. In this regard, this disclosure appreciates that greater spacing between the protrusions 126 on each respective perimeter portion 112A, 112C provides greater stability for the computing module when coupled to the carrier 100, while confining the protrusions 126 and corresponding adjustment screws 128 between the lug pairs 118A-118B or 118C-118D permits the adjustment screws 128 to be obscured from view by the optional strap 140.

In other embodiments, the protrusions 126 include a molded or machined feature attached to the body 110 via pressure sensitive adhesive (PSA) attached to cellular urethane foam spacers that are substantially resilient. The resilient nature of the foam spacers permits the foam spaces to (1) bias the machined feature outwards so as to engage a corresponding detent 226 when the computing module 200 is coupled to the carrier 100 and (2) deflect inwards for attachment/detachment of the computing module 200 to/from the carrier 100.

Alternately or additionally, as best shown in FIG. 1A, grooves 228 are in communication with the detents 226. In particular, the grooves 228 may extend from the top portion 210A to the detents 226. Such a configuration can guide the protrusions 126 into engagement with the detents 226. As the protrusions 126 move into proximity with the detents 226, the protrusions 126 may move into the detents 226 to provide positive coupling of the computing module 200 to the carrier 100.

Further, the grooves 228 can provide further alignment of the computing module 200 to the carrier 100 as the protrusions 126 would interfere with the perimeter portions 112B-112D if the computing module 200 were improperly oriented.

In addition to the ridge 122, notch 124, and protrusions 126, the engagement features 120 may include one or more magnetically sensitive areas coupled to or integrated with the body 110. Magnetically sensitive areas may include permanently magnetized materials, electrically magnetized materials, as well as non-permanently-magnetized materials that are nevertheless responsive to a magnetic field (hereinafter "magnetically responsive materials"), such as ferromagnetic and ferrimagnetic materials. Accordingly, the attractive forces described below may be between, e.g., a permanent magnet and a magnetically responsive material or between permanent magnets as desired. The position of the permanent magnets and magnetically responsive materials may be switched as desired. For example, magnetically sensitive areas may be positioned within or integrated with one or more of the perimeter portions 112A-112D. Such magnetically sensitive areas may cooperate with magnetically sensitive areas coupled to or integrated with components positioned within or on the case 210. In such a configuration, magnetic attraction between magnetically sensitive areas associated with the body 110 and magnetically sensitive areas associated with the case 210 may aid in coupling the case 210 to the body 110.

In at least one example, the optical display subsystem 240 is coupled to the case 210 so as to define an interior enclosure, which may be water resistant or water tight, as desired.

The interaction between the docking station 300 and the computing module 200 will be discussed in more detail at an appropriate point after the more detailed discussion of the configuration of the example computing module 200 below.

The computing module 200 depicted in FIGS. 1A and 1B is only one example of a computing module that can be implemented in connection with carrier 100, docking station 300, or other suitable carrier. A specific embodiment of the computing module 200 is provided with respect to FIGS. 2A-2C, and various other computing modules 200', 400, and 500 are disclosed with respect to FIGS. 3-5 that can be implemented in connection with carrier 100, docking station 300, or other suitable carrier.

Additionally, the computing modules 200, 200', 400 and 500 implemented in connection with the carrier 100, docking station 300 or other suitable carrier can include an analog or digital face, a post, such as post 224, that protrudes from a corresponding lateral sidewall of the computing module 200, 200', 400 or 500 or that is flush with the corresponding lateral sidewall, various engagement features such as detents 226 and/or magnetically sensitive areas, various interface connector 230 positions and arrangements, and a body 210, 210', 410, 510 made of any suitable material, such as metal, plastic, or the like.

Figure 2A:
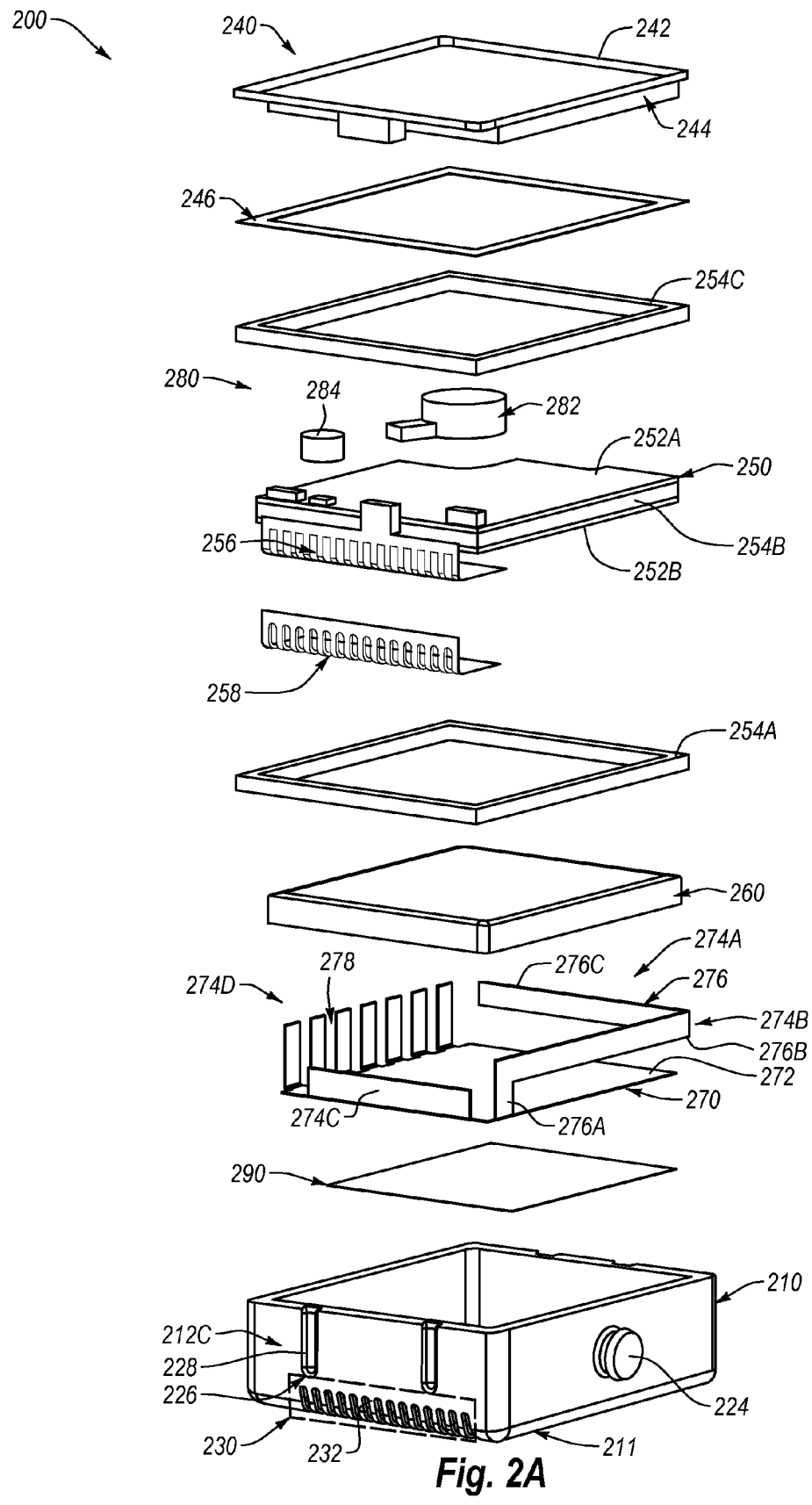
FIG. 2A shows an exploded perspective view of the wearable computing module of FIG. 1A.

FIG. 2A shows an exploded perspective view of the computing module 200 of FIGS. 1A-1B according to some embodiments. As shown in FIG. 2A, in addition to the case 210 and the optical display subsystem 240, the computing module 200 may include a plurality of stacked components that includes a circuit element assembly 250, a power cell such as a rechargeable battery 260, a multi-function support cage 270 (hereinafter "cage 270"), and one or more additional input/output devices, which are collectively labeled as 280. In at least one example, an optional adhesive backing 290 may be provided as well.

By way of introduction, the circuit element assembly 250 provides computing power to receive input from and/or control the output of the optical display subsystem 240. The circuit element assembly 250 includes one or more processing elements, which may be positioned on or integrated with printed circuit boards (PCBs) 252A, 252B with sufficient processing power to support the communication protocols and data transfer overheads of the computing module 200, as well as to process input and output via a touch-screen active display 244 (hereinafter "active display 244") of the optical display subsystem 240 and/or any other input/output components.

The power cell 260 acts as a power source for the circuit element assembly 250 and the optical display subsystem 240. The power cell 260 may also act as a power source for the input/output devices 280. In at least one example, the circuit element assembly 250 and/or the power cell 260 may also be coupled to the interface connector 230, which may allow the computing module 200 to recharge and/or synchronize with a computer or other external device. Further, the power cell 260 may be any type of component configured to provide power to the circuit element assembly 250 and the active display 244. In at least one example, the power cell 260 may be a rechargeable lithium-ion polymer (Li-Poly) battery, optionally with embedded integrated circuit (IC) protection. Any suitable type of connection and/or routing may be used to allow the power cell 260 to provide electrical energy to the circuit element assembly 250, optical display subsystem 240, and/or any other electrical components of the computing module 200.

Figure 2B:
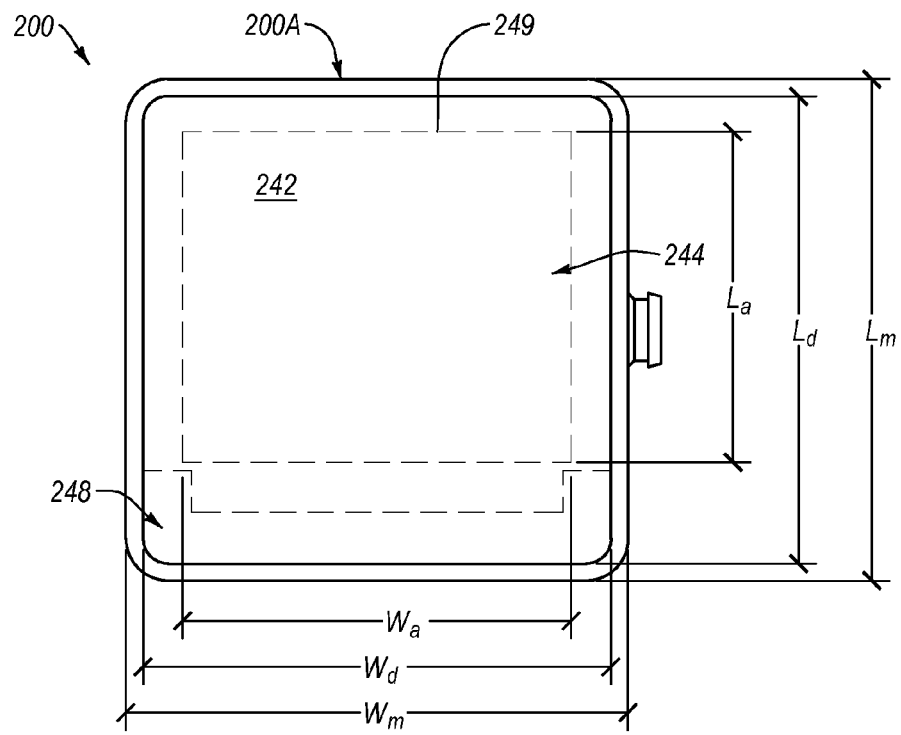
FIG. 2B is a top view of the wearable computing module of FIG. 1A.

While the power cell 260 and case 210 are illustrated as discrete components in FIG. 2B, in other embodiments the power cell 260 and case 210 can be at least partially integrated. For example, the case 210 can be configured to include an integrally formed power cell 260 that is integral with the case 210. Such an implementation may reduce manufacturing steps and thickness of the computing module 200.

In the illustrated example, the power cell 260 may be coupled to the circuit element assembly 250 through abutment contacts. The circuit element assembly 250 then routes electrical energy to the optical display subsystem 240 through any suitable connection, such as through abutment contacts. In other examples, flexible connectors and/or pigtail-type connectors may be used to connect the power cell 260 to the circuit element assembly 250, to connect the power cell 260 to the optical display subsystem 240, and/or to connect the circuit element assembly 250 to the optical display subsystem 240. Any type of suitable connectors, including abutment contacts, flexible connectors, and/or pigtail-type connectors may be used to connect the circuit element assembly 250 to the interface connector 230 shown.

The example optical display subsystem 240 may generally include an optically transparent cover 242 and the active display 244 overlaid on the optically transparent cover 242. In the illustrated example, a sealing member 246 is configured to be positioned between the optically transparent cover 242 and the case 210. The sealing member 246 may provide a sufficient seal between the optically transparent cover 242 and the case 210 such that a water resistant or water-proof enclosure is defined by the optically transparent cover 242 and the case 210.

In at least one example, the optically transparent cover 242 and the active display 244 may cooperate to provide a projected, capacitive screen configured to detect and/or track a single fingertip touch or multiple fingertip touches. The active display 244 may be a liquid-crystal display, an organic light emitting diode display, an electrophoretic display, an electrowetting display, or other suitable display.

As shown, the circuit element assembly 250 may be connected to and stacked below the active display 244. In particular, the PCBs 252A, 252B may be spaced apart from one another and positioned below the optical display subsystem 240 and above the power cell 260. In the illustrated example, a plurality of spacers 254A, 254B, 254C may be utilized. In particular, spacer 254A may space the PCB 252B from the power cell 260. Such a configuration may allow the power cell 260 to expand slightly without exerting a compressive force on the PCB 252B. The power cell 260 may expand during normal operation of the computing module 200, such as during charging operations or other operations.

Spacer 254B may be positioned between PCB 252B and PCB 252A to maintain a desired separation between the two. Spacer 254C may be positioned between PCB 252A and the active display 244. In at least one example, the spacers 254A-254C may be formed of a low-durometer material with low-thermal resistance, such as a thermal-gap material. Such a material may maintain spacing between the components while transferring heat generated by the optical display subsystem 240, the circuit element assembly 250, and/or the power cell 260 to the case 210, which may facilitate efficient cooling of the computing module 200. Efficient cooling of the computing module 200 may help ensure proper operation of the components described herein.

In at least one example, the circuit element assembly 250 includes a set of external connector pads 256 (hereinafter "pads 256") configured to provide electrical connections that are exposed through openings 232 in the case 210 to form the external connector interface 230, thereby allowing computing module 200 to be connected to the docking station 300 (FIG. 1) or other carrier with a suitable electrical interface.

In the illustrated example, a seal 258 may be positioned between the pads 256 and openings 232 defined in the case 210. In at least one example, the seal 258 may include a rubber bladder that is pressure sensitive and adhesive mounted to the inside of the case 210. The seal 258 may further include backing plate on the inside, which may be attached with some other form of waterproofing elements as desired.

In the example shown in FIG. 2A, the openings 232 defined in the case 210 extend from lateral side wall 212C into the bottom portion 211. Further, the mechanical design of the computing module 200 includes an asymmetric placement of the interface connector 230, including the openings 232, in order to provide alignment between the computing module 200 and electrically active carriers or docking station accessories, such as docking station 300 shown in FIG. 1. Such asymmetric placement of the pads 256 and the openings 232 may help prevent or inhibit damage to the computing module 200 in case a user accidentally attempts to dock the computing module 200 backward or in some other incorrect orientation.

In one example embodiment, the pads 256 include a total of fourteen pads, with four of the pads providing a standard Universal Serial Bus (USB) 2.0 interface. In some embodiments, the remaining ten pads include a powerOut/Reset pad, an analogButton pad, two pads for an I$^2$C interface (e.g., one for SCL and one for SDA), an RF_ground pad, four pads for audio (e.g., audioLeft, audioRight, audio ground and microphone) and a Reserved pad for, e.g., RF input. Other pad assignments and number of pads 256 are possible as well, as should be known to those of ordinary skill in the art. Further, the pads 256 may be gold-plated as desired to provide enhanced electrical connections.

The stacked components, including the optical display subsystem 240, the circuit element assembly 250, and/or the power cell 260 may be supported by the cage 270. As shown in FIG. 2A, the cage 270 may generally include a base portion 272.

In one embodiment, the dimensions of the cage 270 are configured so as to allow the cage 270 to be in physical contact with the case 210, with the cage 270 being shaped to provide structural integrity and support to the case 210. In at least one example, the case 210 may be formed of a thin polycarbonate material. In such an example, the cage 270 may maximize the available internal volume that can be used for the stacked electrical components. In at least one example, the cage 270 is made of ferrous steel with non-corrosive coating, such as nickel or tin. Further, in at least one example, the base portion 272 may be configured to provide direct physical support for the power cell 260.

In addition, as shown in FIG. 2A, lateral side portions 274A-274D are distributed about the base portion 272. In particular, in the illustrated example, the lateral side portions 274B and 274A define an antenna 276. The antenna 276 includes a first portion 276A, a second portion 276B, and a third portion 276C.

More specifically, the first portion 276A may extend upwardly from the base portion 272 to the second portion 276B. The second portion 276B may extend to the third portion 276C and be generally parallel to the base portion 272. The third portion 276C may be transverse to the second portion 276B and also be generally parallel to the base portion 272. As a result, the first portion 276A and the second portion 276B of the antenna 276 may serve as lateral side portion 274B while the third portion 276B of the antenna 276 may serve as the lateral side portion 274A.

Although the antenna 276 is depicted in FIG. 2A as having an "L" shape that extends laterally along portions of lateral sidewalls 212A and 212B of the case 210, in other embodiments the antenna 276 can have other shapes and/or different positions. For instance, the antenna 276 may extend laterally along portions of lateral sidewalls 212B, 212C and 212D and have a "U" shape. In these and other embodiments, the antenna 276 may begin at and extend along about 80% of the lateral sidewall 212B, then wrap and extend along about 100% of the lateral sidewall 212C, then wrap and extend along about 80% of the lateral sidewall 212D where it is terminated. Alternately or additionally, along each of lateral sidewalls 212B-212D, the antenna 276 vertically extends about 40% of the height of lateral sidewalls 212B-212D. Optionally, the antenna 276 in these and other embodiments is frequency tuned based on the material and/or geometry of one or more of the components of computing module 200.

In at least one example, the antenna 276, and the third portion 276C in particular may be configured to serve as a GPRS antenna, WiFi antenna, an FM radio antenna, a proximity detection antenna, a 3G antenna, a WiMAX antenna, or as an antenna for other communication protocols or standards. The antenna 276 may also be a chip antenna that is transparent in at least one direction and may receive through the case 210 as desired.

In such an embodiment, as shown in FIG. 2B, the active display 244 may include one or more radio-transparent portion(s) 248 to provide radio signal access to the antenna 276 (FIG. 2A). In some embodiments, the radio-transparent portion 248 includes an area of the active display 244 over which a capacitive touch interface is not provided. This disclosure appreciates that such capacitive touch interfaces my include indium tin oxide (ITO) that forms capacitive sensing elements. Whereas the ITO or other material(s) that forms the capacitive sensing elements of the capacitive touch interface creates electrical shielding that can shield RF signals, excluding the radio-transparent portion 248 from coverage by the capacitive touch interface permits the radio-transparent portion 248 to be transparent to RF signals.

Alternately or additionally, the active display 244 may include an active area 249. Mechanical support, routing, the radio-transparent portion 248, etc. may be provided in the active display 244 outside of active area 249. The capacitive touch interface may also be provided substantially over the entirety of the active area 249.

As shown in FIG. 2B, the active display 244 may include a relatively large percentage of the overall surface area of a front portion 200A of the computing module 200. In particular, in one example, an entire front portion 200A of the computing module 200A may have a length $L_m$ of about 36 mm while the active display 244 may have a length $L_d$ of about 32 mm and the active area 249 may have a length $L_a$ of about 25.4 mm. Similarly, the entire front portion 200A may have a width $W_m$ of about 32 mm while the active display 244 has a width $W_d$ of about 28 mm and the active area 249 has a width $W_a$ of about 25.4 mm.

In such a configuration, the active display 244 may have a surface area that is about 78 percent of the total surface area of the front portion 200A. Alternately or additionally, the active area 249 may have a surface area that is about 56% of the total surface area of the front portion 200A.

Referring again to FIG. 2A, the lateral side portion 274C may be a support extending from the base portion 272, which may provide support for the power cell 260. As also shown in FIG. 2A, lateral side portion 274D may also be configured to provide support to the power cell 260 and to the circuit element assembly 250.

In the illustrated example, the lateral side portion 274D may define a wall with a plurality of slots 278 defined therein. The slots 278 may be formed in order to reduce signal shielding of the lateral side portion 274D with respect to the antenna 276.

Additionally and optionally, the computing module 200 may include one or more additional antennae (not shown) configured as one or more traces deposited on the active display 244. Additionally and optionally, the circuit element assembly 250 may include one or more additional antennae. In one embodiment, antennae and wireless subsystems are configured so as to not interfere with each other. Alternatively, system software is configured to orchestrate the use of the various antennae in order to deliver appropriate functionality.

The cage 270 may further include a magnetically sensitive area to allow accessories (such as docking stations, enclosures, etc.) to rely on the presence and magnetic properties of the cage 270 to hold and/or align the computing module 200 with the accessories. These magnetically sensitive areas may include any desired part(s) of the cage 270, such as parts of the base portion 272 and/or the lateral side portions 274A-274D.

For example, as previously discussed, one or more of the perimeter portions 112A-112D of the body 110 (FIG. 1) may include magnetically sensitive areas coupled to or integrated therewith. In such a configuration, magnetic attraction may be present between magnetically sensitive areas associated with the body 110 and magnetically sensitive areas associated with the cage 270. Accordingly, the cage 270 may include one or more magnetically sensitive areas coupled to or integrated therewith.

In at least one example, the stacked electronic components may include anti-magnetic materials. These anti-magnetic materials may be used with the magnets described above and may help isolate the operation of the stacked electronic components from the magnetic fields generated by the magnets while still allowing the magnets to provide physical coupling. Further, magnets may be used to provide desired sensing or other functionality, such as Hall Effect sensors.

As previously discussed, in addition to the power cell 260, the circuit element assembly 250, and the optical display subsystem 240, the computing module 200 may include additional I/O components 280. For example, the I/O components 280 may include a vibrating element 282, such as a vibration motor, configured to produce vibrational energy for providing discrete tactile alerts to a wearer of the computing module 200.

In one embodiment, the location of the vibrating element 282 is chosen such that the vibrating element 282 does not present significant blockage to the antenna signals, especially when the case 210 is a metal casing. The vibrating element 282 may transfer the vibrations to the case 210 by way of the cage 270 or by way of other internal components as desired.

Optionally, the computing module 200 may include a piezoelectric element 284 configured to produce auditory signals for alerting a wearer of the computing module 200. In one embodiment, a reliable and lightweight low-power consumption piezoelectric element 284 may be used, for example having a resonant frequency in the range of approximately 4.1 to 7.0 kHz, and approximately 1.2 to 2.0 mm in dimension.

Optionally, the computing module 200 includes an accelerometer (not shown), a gyro (not shown), a compass (not shown), or the like or any combination thereof. Such components may allow for applications which rely on motion detection, for power management optimizations using motion to identify appropriate power state, and/or for recognizing user gestures used to accept user input or wake a processor from a deep-sleep state via external interrupt.

In at least one example, the post 224 described above and shown in FIG. 1A may have a recess defined therein. In such an example, the recess may include circuitry associated therewith that is coupled to the circuit element assembly 250 (FIG. 2A) that allow the post 224 to engage an audio connector associated with the circuit element assembly 250.

Figure 2C:
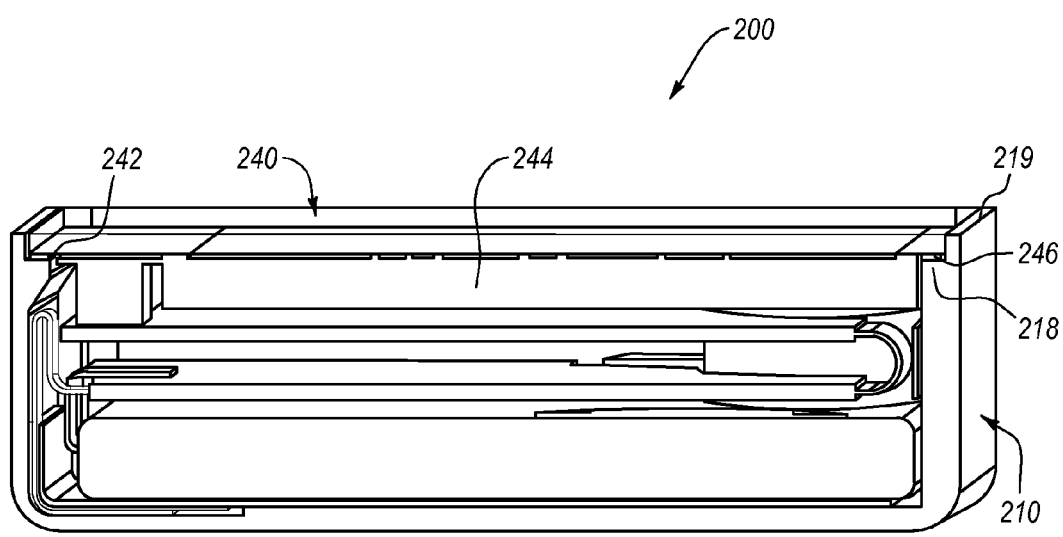
FIG. 2C is a cross-sectional view of the wearable computing module of FIG. 1A taken along section 2C-2C of FIG. 1A.

As introduced, the components described above may be positioned within a waterproof or water-tight enclosure formed by sealingly coupling the optical display subsystem 240 to the case 210. FIG. 2C illustrates a cross-sectional view of the computing module 200 taken along section 2C-2C of FIG. 1A. FIG. 2C illustrates one sealing arrangement in more detail. In the example illustrated in FIG. 1A, the lateral sidewalls 212A-212D form a ledge 218 and a retention lip 219 as shown. The ledge 218 may be sized to receive and support the outer perimeter of the optically transparent cover 242 while the lip 219 corresponds closely to the outer shape and size of the optically transparent cover 242. As a result, the sealing member 246 may be placed on the ledge 218 after which the optically transparent cover 242 may be positioned on the ledge 218 and in proximity with the lip 219 to thereby sealingly couple the optical display interface 240 to the case 210.

Figure 3:
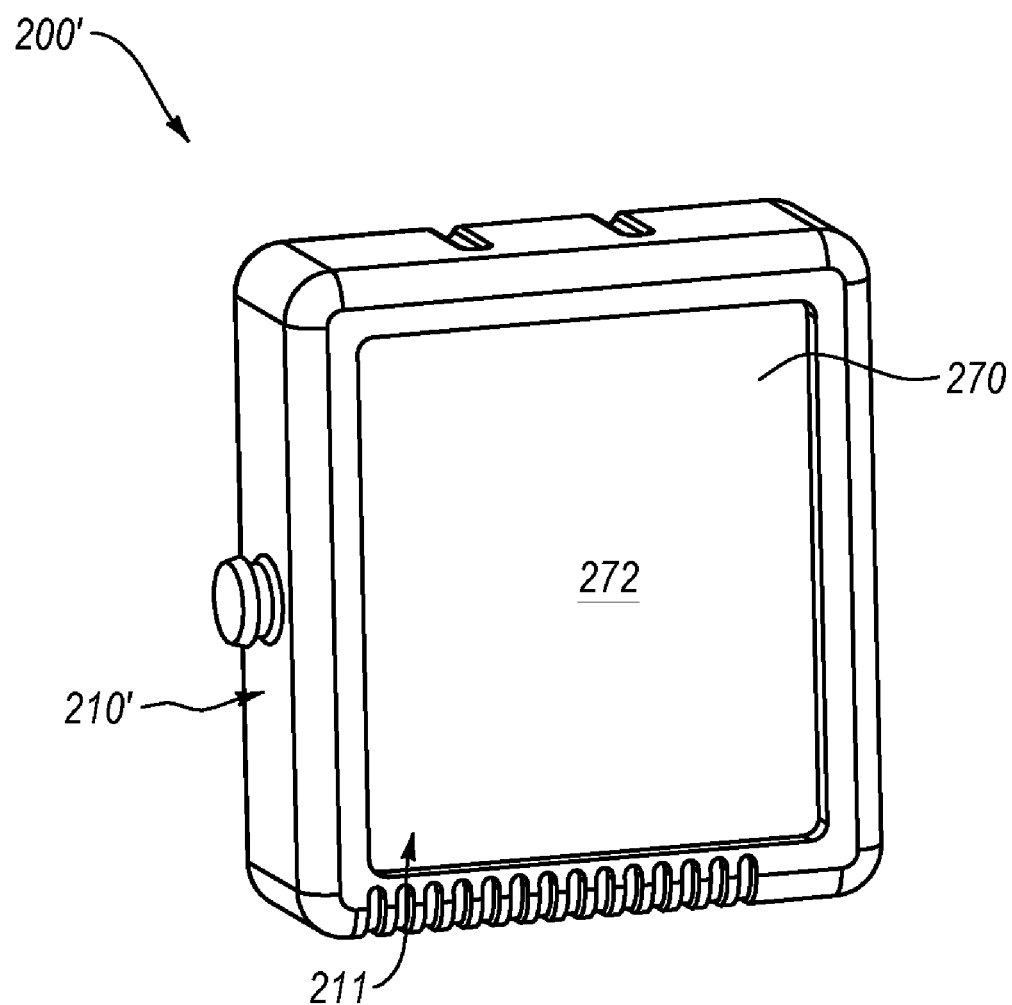
FIG. 3 illustrates a rear view of a wearable computing module according to another example.

FIG. 3 illustrates a computing module 200' according to another example embodiment. As shown in FIG. 3, a case 210' may be provided that includes an opening defined in a rear portion 211 of the case 210'. Such a configuration may expose the base portion 272 of the cage 270, thereby allowing the base portion 272 to also serve as a bottom of the computing module 200. In such an example, the base portion 272 may be configured to be in contact with a wearer of the computing module 200, thereby conducting heat away from the computing module 200 and into the wearer.

Figure 4:
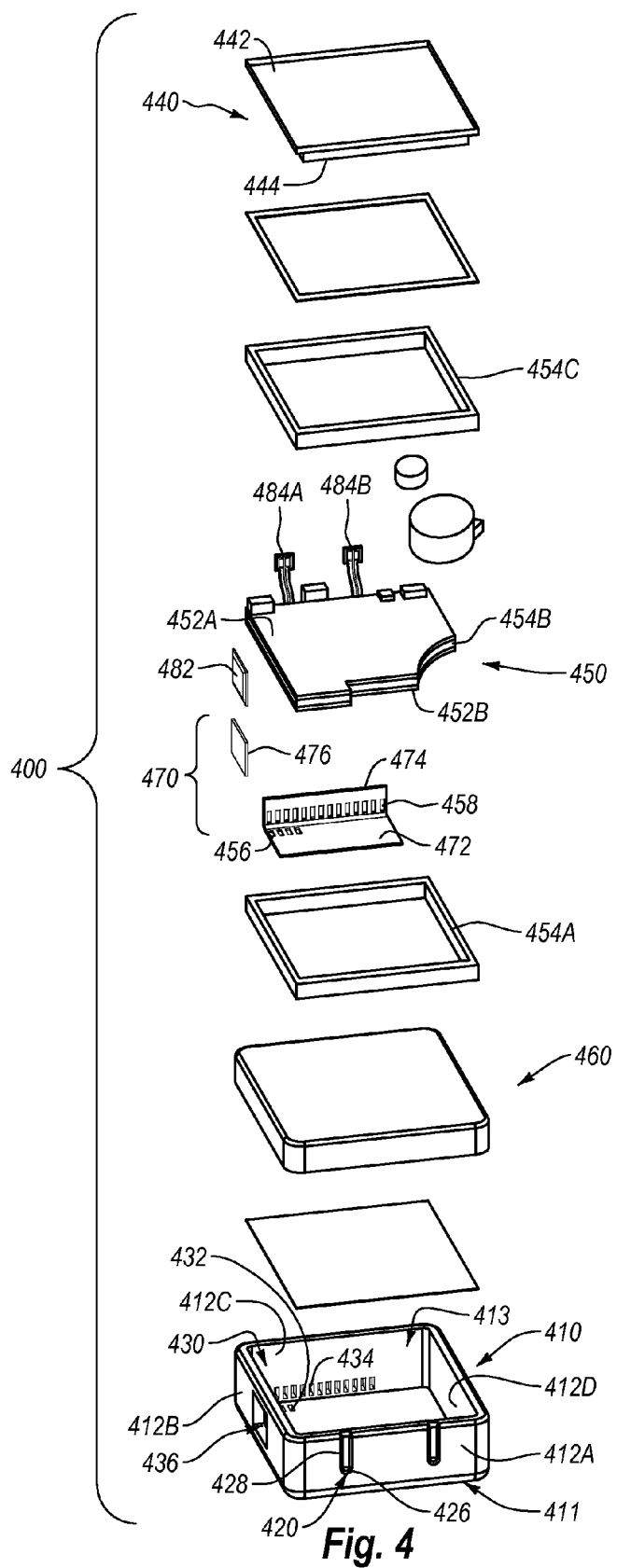
FIG. 4 illustrates an exploded view of a wearable computing module according to another example.

FIG. 4 illustrates an exploded view of another example embodiment of a computing module 400 that may be coupled to a carrier, such as carrier 100 (FIG. 1A), and/or a docking station, such as docking station 300 (FIG. 1A). In the illustrated example, the computing module 400 includes a case 410, optional engagement features 420, interface connector 430, an optical display interface 440, a circuit element assembly 450, a power cell 460, and sealing members, collectively referred to as 470. Configurations of each of these components will be introduced generally followed by a discussion of the assembly of the computing module 400.

As illustrated in FIG. 4, the case 410 generally includes a bottom portion 411 and lateral side walls 412A-412D that define an enclosure 413 configured to receive at least a portion of at least one of the components described above.

In at least one example, the bottom portion 411 and the lateral side walls 412A-412D may be continuous. In particular, the case 410 may be formed from a homogenous material that is worked to form the bottom portion 411 and the lateral side walls 412A-412D. For example, the material may be a metallic material, plastic materials such as thermoplastics, composite materials, such as fiber reinforced, or other composite materials. Metallic materials may include, without limitation, aluminum materials and stainless steel materials, including medical-grade stainless steel, preplated steel materials, and/or materials that are combinations of ferrous and non-ferrous metals. These materials can be formed into the desired shape shown through any combination of one or more processes, such as stamping, machining, casting, molding, or any other type of forming process.

Various features can be coupled to or formed into the case 410. For example, the case 410 may include engagement features 420 formed in one or more of the lateral side walls 412A-412D. In the illustration, the engagement features 420 include detents 426 and grooves 428 formed in lateral sidewalls 412A, 412C similar to the detents 226 and grooves 228 in the computing module 200 described above (all shown in FIG. 1A). Accordingly, the engagement features 420 may facilitate coupling of the computing module 400 to a carrier, such as the carrier 100 described above. In such a configuration, the engagement features 420 may be covered by the carrier 100 (FIG. 1) when the computing module 400 is coupled to the carrier 100 (FIG. 1).

A portion of the interface connector 430 may also be hidden by the carrier 100 (FIG. 1) when the computing module 430 is coupled to the carrier 100 (FIG. 1). In particular, the interface connector 430 may include bottom openings 432 defined in the bottom portion 411 and side openings 434 defined in lateral sidewall 412C. In the illustrated example, the bottom openings 432 are separate from and spaced apart from the side openings 434.

In at least one example, there may be more side openings 434 than bottom openings 432. For example, there may be fourteen side openings 434 and four bottom openings 432. Such a configuration may correspond to expanded interaction with the computing module 400 via the side openings 434 and basic interaction with the computing module 434 via the bottom openings 432. As will be discussed in more detail below, the bottom openings 432 may facilitate basic interactions such as charging or connection with a computer. Such a configuration may allow the power cell 460 to be charged while the computing module 400 remains coupled to the carrier 100 (FIG. 1), which can provide flexibility in use of the computing module 400.

In the illustrated example, the power cell 460 can provide power to the optical display subsystem 440 and the circuit element assembly 450 in similar manner as the power cell 460 provides power to the optical display subsystem 240 and the circuit element assembly 250 in the example described above with reference to FIG. 2A.

While the power cell 460 and case 410 are illustrated as discrete components in FIG. 4, in other embodiments the power cell 460 and case 410 can be at least partially integrated. For example, the case 410 can be configured to include an integrally formed power cell 460 that is integral with the case 410. Such an implementation may reduce manufacturing steps and thickness of the computing module 400.

The circuit element assembly 450 includes one or more printed circuit boards 452A, 452B. The PCBs 452A, 452B may be spaced apart from one another by a plurality of spacers 454A, 454B, 454C, which may be similar to spacers 254A, 254B, 254C described above, or spacers 454A, 454B, 454C may be different. The circuit element assembly 450 may also include connector pads coupled to one or more of the PCBs 452A, 452B, such as bottom connector pads 456 and side connector pads 458 (collectively "connector pads 456, 458"). The bottom connector pads 456 may have sizes, spacings, and/or shapes that allow the bottom connector pads 456 to be exposed through the bottom openings 432. Similarly, the side connector pads 458 may also have sizes, spacings, and/or shapes that allow the side connector pads 458 to be exposed through the side openings 434.

One or more of the sealing members 470 seal the connector pads 456, 458 with respect to the interface connector 430. For example, a bottom pad seal portion 472 may be utilized to seal the bottom connector pads 456 to the bottom openings 432 and a side pad seal portion 474 may be utilized to seal the side connector pads 458 to the side openings 434. The bottom pad seal portion 472 and the side pad seal portion 474 may be separate or may be integrated into a single seal, as shown.

In at least one example, the bottom pad seal portion 472 and the side pad seal portion 474 may include a combination of a rubber bladder that is mounted to the inside of the case 410 with pressure-sensitive adhesive or another suitable adhesive. The bottom pad seal portion 472 and/or the side pad seal portion 474 may further include a backing plate on the inside, the backing plate being attached with some other form of waterproofing elements. Such a configuration may provide a water-tight or water-resistant interface that may permit the computing module 400 to be electrically coupled to a variety of external devices as desired.

In another example in which the case 410 is molded from plastic or other mold-able material, the bottom pad seal portion 472 and side pad seal portion 474 can be omitted. In these and other embodiments, the bottom and side connector pads 456, 458 can be inserted into a case 410 mold. Plastic can then be injected molded into the case 410 mold around the bottom and side connector pads 456, 458, thereby securing the bottom and side connector pads 456, 458 in place within the case 410 and forming a water-tight or water-resistant seal between the case 410 and bottom/side connector pads 456, 458 according to some embodiments.

In yet another example, a port (or ports) is (are) provided in the case 410 that is (are) configured to receive a rubber insert (or inserts) therein. In turn, the rubber insert (or inserts) is (are) configured to receive metal bottom/side connector pads 456, 458 therein.

Button seal 476 may seal the case 410 in such a way as to allow user interaction with the computing module 400. In particular, the button seal 476 may be configured to seal a button opening 436 defined in lateral sidewall 412B. In the illustrated example, I/O components may include any of the I/O components implemented in the computing module 200 described above. The I/O components may also include a button 482 configured to receive user input. The button 482 may be positioned and maintained in proximity with the button seal 476 to allow the button seal 476 to act on the button 482 to receive the user input.

In particular, an inward force exerted on the button seal 476 may cause the button seal 476 to move inwardly through the button opening 436 and into contact with the button 482. The button 482 then communicates the input to the circuit element assembly 450, as is known in the art. In at least one example, the button 482 may be a flush-mounted button so as to not extend beyond the lateral sidewall 412B. The user input may be received directly from the user or through an intermediate component associated with the carrier 100 or other carrier. The user input may relate to functionality such as reset, backlighting, specialized functions, or other functionality that may be determined according to duration and/or pattern of user input. The inward force exerted on the button seal 476 in some embodiments is provided by an external button on the carrier 100 that aligns with the button seal 476 when the computing module 400 is coupled to the carrier 100.

The computing module 400 may also be configured to receive input and/or provide output through one or more antenna, such as antennae 484A, 484B. Each of the antennae 484A, 484B may be configured to serve as at least one of a GPRS antenna, WiFi antenna, a GPS antenna, a Bluetooth antenna, an FM radio antenna, a proximity detection antenna, a 3G antenna, a WiMAX antenna, or as an antenna for other communication protocols or standards.

The antennae 484A, 484B may be coupled to the circuit element assembly 450 in any desired manner. For example, antenna 484A may be coupled to PCB 452A while antenna 484B may be coupled to antenna 452B. The antennae 484A, 484B may be located at any desired position within the computing module 400. In the illustrated example, the antennae 484A, 484B are positioned in proximity with the optical display subsystem 440. In particular, the antennae 484A, 484B may be positioned on a bottom surface of an optically transparent cover 442 adjacent an active display 444, which may also be coupled to the bottom surface of the optically transparent cover 442. More particularly, the antennae 484A, 484B may be positioned beneath a radio-transparent portion (not labeled) of the optical display subsystem 440.

In other examples, an external antenna (not shown) may use a coaxial means to couple with the circuits inside the computing module 400. Further, the coaxial means may be a connector that is sealed against water (waterproof) in a manner similar to what has already been described. Accordingly, in some embodiments, the computing module 400 includes a connector electrically coupled to the circuit element assembly 450 where the connector is configured to receive and be electrically coupled to an external antenna including an external coaxial cable.

When assembled, the antennae 484A, 484B are positioned above the circuit element assembly 450 to allow the circuit element assembly 450 to receive wireless signals via the antennae 484A, 484B. In at least one example, the computing module 400 may be assembled in the positions described above in a bottom up manner in which the spacers 454A, 454B, 454C are used to maintain desired separation between the various components. In other examples, components may be maintained in position through features associated with the case.

Figure 5:
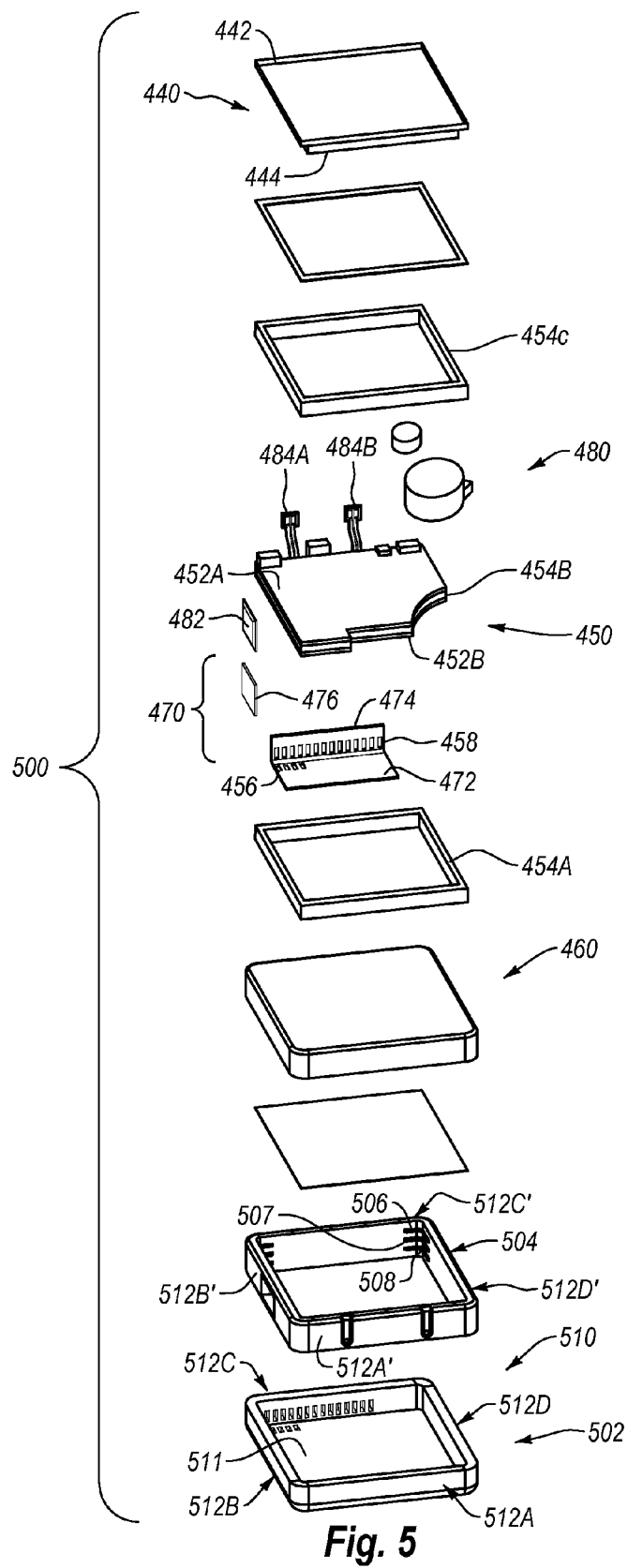
FIG. 5 illustrates an exploded view of a wearable computing module according to another example.

One such example is illustrated in more detail in FIG. 5. In particular, FIG. 5 illustrates a computing module 500 similar to the computing module 400 of FIG. 4 with a multi-piece case 510. Like components are labeled with like references numbers and are not described in further detail.

As shown in FIG. 5, the multi-piece case 510 may include a lower component 502 and a upper component 504. In the illustrated example, the lower component 502 includes a bottom portion 511 and lower sidewalls 512A-512D extending from the bottom portion 511. The upper component 504 may include upper sidewalls 512A'-512D' that are configured to be coupled to the lower sidewalls 512A-512D to form the assembled multi-piece case 510 in any suitable manner. For example, seals, gaskets, screws, other types of fasteners and/or combinations thereof may be used to couple the lower component 502 and the upper component 504 together.

In at least one example, spacing features 506, 507, 508 may be formed on the upper sidewalls 512A'-512D'. In the illustrated example, the spacing features 506, 507, 508 may include one or more ledges and/or slots that are configured to receive desired component(s), such as edges of one or more of the PCBs 452A, 452B and/or a bottom surface of the active display 444. Such a configuration may allow for flexibility in the configuration of the computing module 400 as well as flexibility in assembly of the computing module 400. For example, separating the lower component 502 and the upper component 504 may allow the multi-piece case 510 to readily be formed of differential materials, including combination of thermoplastic, steel, aluminum, non-ferrous metals, and/or other materials. Such a configuration can provide for flexibility in combining aesthetics and/or functionality of each material as desired.

While the power cell 460 and multi-piece case 510 are illustrated as discrete components in FIG. 5, in other embodiments the power cell 460 and a portion of the multi-piece case 510 can be at least partially integrated. For example, the lower or upper component 502, 504 of multi-piece case 510 can be configured to include an integrally formed power cell 460 that is integral with the lower or upper component 502 or 504, respectively. Such an implementation may reduce manufacturing steps and thickness of the computing module 500.

Figure 6A:
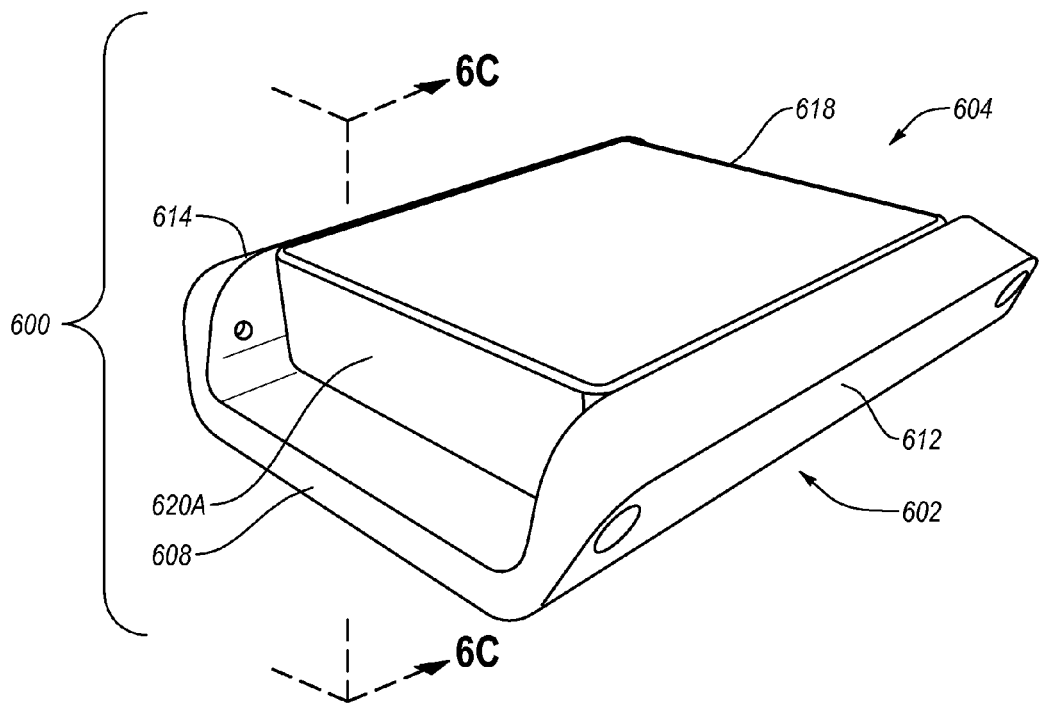
FIGS. 6A-6C respectively illustrate a perspective view, an exploded perspective view, and a section view of a wearable computing module kit including a wearable computing module and a wearable carrier according to another example.
Figure 6B:
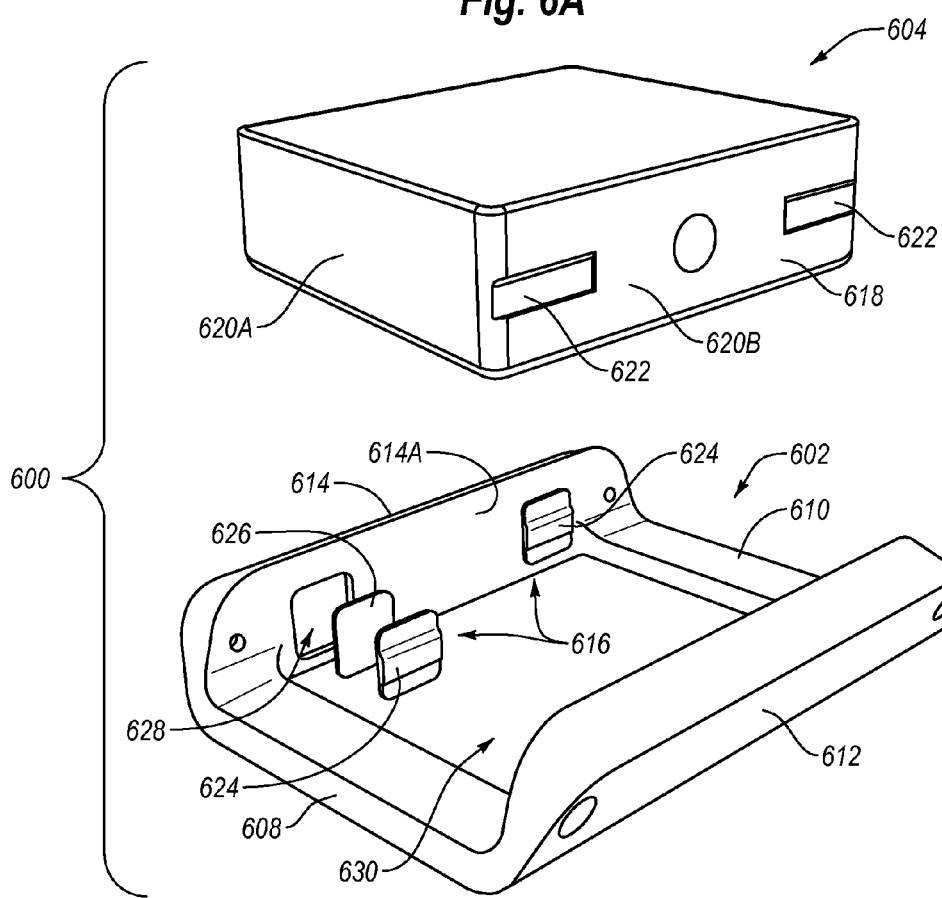
Figure 6C:
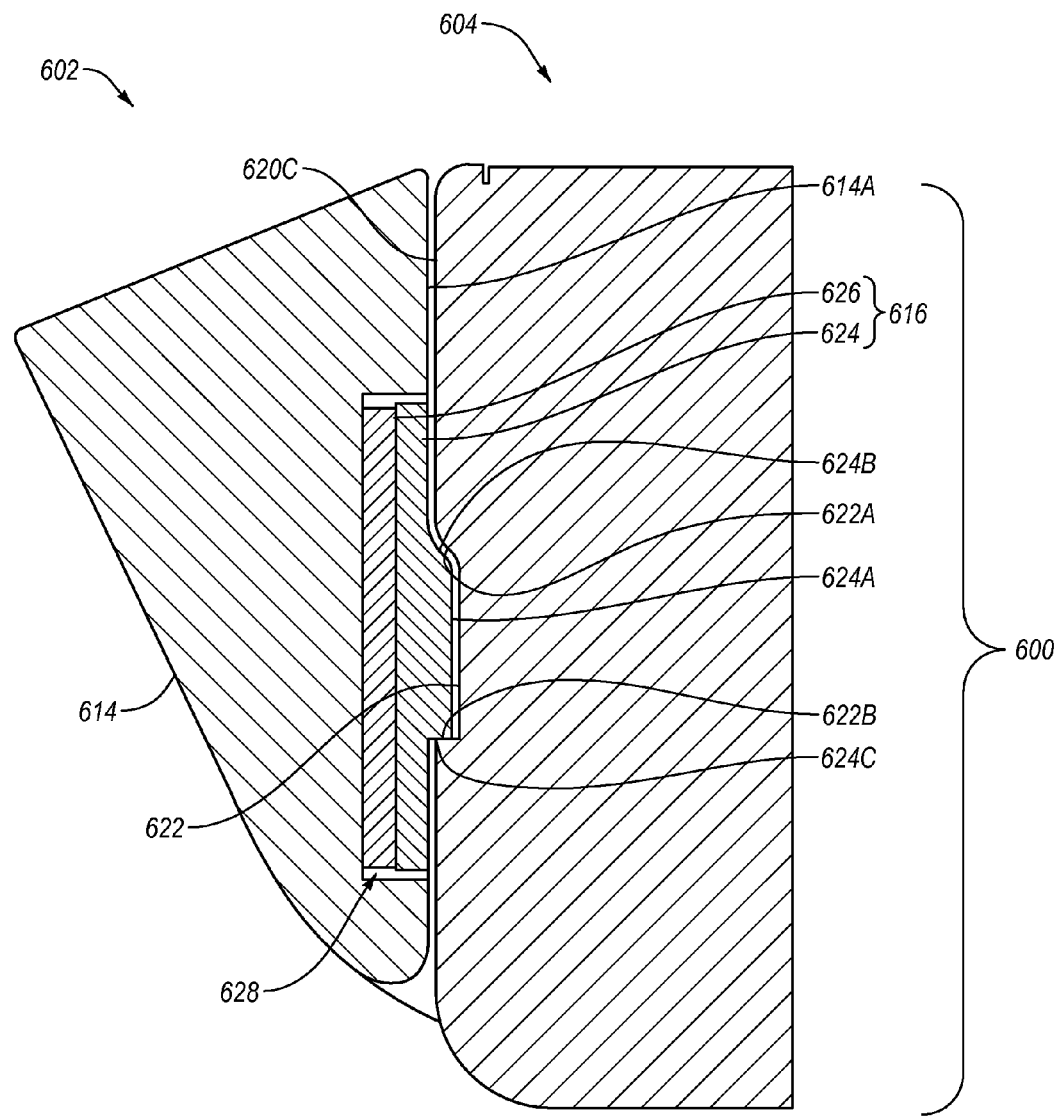

FIGS. 6A-6C illustrate aspects of another wearable computing module kit 600 according to some embodiments. In particular, FIGS. 6A and 6B are a perspective view and an exploded perspective view of the wearable computing module kit 600 and FIG. 6C is a cross-section of a portion of the wearable computing module kit 600 along section 6C-6C shown in FIG. 6A. The wearable computing module kit 600 includes a wearable carrier 602 (hereinafter "carrier 602") and a wearable computing module 604 (hereinafter "computing module 604").

The carrier 602 and computing module 604 are similar in some respects to the carrier 100 and computing modules 200, 200', 400 and 500 described above. For example, the carrier 602 includes a body (not labeled). The body includes opposing base members 608 (FIGS. 6A-6B), 610 (FIG. 6B) and opposing sidewalls 612, 614 (FIGS. 6A-6B) interposed between base members 608, 610. The carrier 602 additionally includes a plurality of engagement features 616 (FIGS. 6B-6C).

The computing module 604 includes a case 618. The case 618 includes a plurality of perimeter sidewalls 620, including perimeter sidewalls 620A (FIGS. 6A-6B), 620B (FIG. 6B) and 620C (FIG. 6C). The case 618 includes a fourth perimeter sidewall 620 that is not visible in any of FIGS. 6A-6C and is therefore not separately labeled as, e.g., 620D. The computing module 604 additionally includes a plurality of engagement features 622.

Each of carrier 602 engagement features 616 includes a protruding bumper 624 (FIGS. 6B-6C) and an spacer layer 626 (FIGS. 6B-6C). Optionally, the bumper 624 and/or spacer layer 626 of each carrier 602 engagement feature 616 are at least partially received within a respective recess 628 defined on an inner surface 614A of sidewall 614. Although not shown, sidewall 612 may similarly define recesses 628 on an inner surface of sidewall 614 for at least partially receiving a respective bumper 624 and spacer layer 626.

The spacer layer 626 of each carrier 602 engagement feature 616 is a resilient material in some embodiments. For example, the spacer layers 626 may include cellular urethane foam, poron, or other suitable material.

Generally, the bumper 624 of each carrier 602 engagement feature 616 includes a material that is softer than a material of the case 618 to substantially prevent scratching of the case 618 during insertion/removal of the computing module 604 into/from the carrier 602. Alternately or additionally, each bumper 624 may include a material that, or may otherwise be configured to, substantially eliminate the generation of rattling noise due to mechanical shock when the computing module 604 is held within the carrier 602.

Each bumper 624 includes a protrusion 624A (FIG. 6C). Each protrusion 624A is configured to engage a corresponding computing module 604 engagement feature 622 to removably retain the computing module 604 within the carrier 602. In particular, each protrusion 624A extends inward beyond the inner surface 614A of sidewall 614—or beyond a corresponding inner surface of sidewall 612, as the case may be—as best seen in FIG. 6C.

Each of computing module 604 engagement features 622 is a detent, e.g., a recess defined in a respective perimeter sidewall 620B or 620C.

When the computing module 604 is inserted into the carrier 602, the computing module 604 is oriented with respect to the carrier 602 such that each detent 622 of the computing module 604 is aligned with a corresponding bumper 624 of the carrier 602. The computing module 604 is then inserted into a recess or cavity 630 defined by the carrier 602.

As the computing module 604 is being inserted downward into the recess or cavity 630, the perimeter sidewalls 620 exert an outward force on the bumpers 624, causing the bumpers 624 to compress corresponding spacer layers 626 and retreat within corresponding recesses 628. When the detents 622 align with protrusions 624A, the spacer layers 626 decompress and displace the bumpers 624 outwards toward the computing module 604 such that the protrusions 624A engage detents 622.

In the illustrated embodiment of FIG. 6C, an upper portion 624B of each protrusion 624A is angled, while an upper portion 622A of each detent 622 is also angled in a manner that is complementary to the angled upper portions 624B. In some embodiments, the angled upper portions 624B, 622A permit the computing module 604 to be removed from the carrier 602 by pushing the computing module 604 completely through the cavity 630 of carrier 602.

In particular, when a downward force is exerted on the computing module 604, the angled upper surface 622A of detent 622 exerts a downward force on the angled upper surface 624B of the protrusion 624A. Due to the angles of angled upper surfaces 622A, 624B, a horizontal force component is exerted by the angled upper surface 622A of detent 622 onto angled upper surface 624B of protrusion 624A, thereby causing the bumpers 624 to compress corresponding spacer layers 626 and to retreat within corresponding recesses 628. The retreat of bumpers 624 into recesses 628 permits the protrusions 624A to disengage from detents 622 so that the computing module 604 can be pushed completely through the cavity of carrier 602.

In some embodiments, the carrier 602 includes a band such that the carrier 602 and computing module 604 can be worn on the wrist of a user. In these and other embodiments, the user's wrist or other portion of the user on which the carrier 602 and computing module 604 are worn may prevent the computing module 604 from inadvertently falling all the way through the back of the carrier 602. Alternately or additionally, flat (or inversely angled) lower surfaces 624C, 622B on protrusion 624A and detent 622, respectively, may prevent the computing module 604 from being inadvertently decoupled from the carrier 602 through the front of the carrier 602.

Various configurations have been described separately. It will be appreciated that any of the components and/or corresponding functionality of the various implementations described above can be combined in other implementations as desired. Further, while certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

What is claimed is:

1. A computing module, comprising:
   a case including a bottom portion and a plurality of lateral sidewalls, the case defining an enclosure;
   an optical display subsystem coupled to the case,
   a circuit element assembly positioned within the enclosure and coupled to the optical display subsystem;
   a power cell coupled to the circuit element assembly;
   an interface connector defined in the case, the interface connector including:
      a plurality of side openings defined in at least one of the lateral sidewalls and a plurality of bottom openings defined in the bottom portion of the case; and
      a plurality of connector pads coupled to the circuit element assembly, the connector pads including a plurality of side pads coupled to the case and in communication with the side openings and a plurality of bottom pads coupled to the case and in communication with the bottom openings.

2. The computing module of claim 1, wherein the computing module includes a first number of side pads and a second number of bottom pads, the first number being greater than the second number.

3. The computing module of claim 1, wherein the bottom connectors are configured to facilitate charging of the power cell.

4. The computing module of claim 1, wherein the lateral sidewalls are continuously formed with the bottom portion.

5. The computing module of claim 1, wherein each lateral sidewall includes a lower sidewall continuously formed with the bottom portion and an upper sidewall sealingly coupled to the corresponding lower sidewall.

6. The computing module of claim 5, further comprising a plurality of spacing features formed in the upper sidewalls, the spacing features being configured to space the circuit element assembly with respect to the power cell and the optical display subsystem.

7. The computing module of claim 1, wherein the optical display subsystem includes an optically transparent cover and an active display.

8. The computing module of claim 7, wherein the optically transparent cover is sealingly coupled to the lateral sidewalls.

9. The computing module of claim 7, wherein the active display includes at least one of a liquid crystal display, an organic light emitting diode display, an electrophoretic display, or an electrowetting display.

10. The computing module of claim 7, further comprising at least one antenna coupled to the circuit element assembly.

11. The computing module of claim 10, wherein the antenna is positioned on bottom surface of the optically transparent cover and adjacent the active display.

12. The computing module of claim 10, wherein the antenna is positioned beneath a radio-transparent portion of the optical display subsystem.

13. The computing module of claim 1, wherein the power cell is integrally formed with the case.

14. The computing module of claim 1, wherein the plurality of side pads and plurality of bottom pads are sealingly coupled to the case.

15. A computing module, comprising:
a case including a bottom portion and a plurality of lateral sidewalls, the case defining an enclosure;
an optical display subsystem coupled to the case,
a circuit element assembly positioned within the enclosure and coupled to the optical display subsystem;
a power cell coupled to the circuit element assembly; and
an interface connector defined in the case, the interface connector including a plurality of side openings defined in at least one of the lateral sidewalls and a plurality of bottom openings defined in the bottom portion of the case;
wherein the optical display subsystem includes an optically transparent cover, an active display coupled to the optically transparent cover, and a radio-transparent portion.

16. The computing module of claim 15, further comprising at least one antenna coupled to the circuit element assembly.

17. The computing module of claim 16, wherein the antenna is coupled to the circuit element assembly and positioned on a bottom surface of the optically transparent cover, adjacent the active display and behind the radio-transparent portion.

18. The computing module of claim 16, further comprising a support cage configured to support the power cell, the support cage including a base, a first upright portion, a second upright portion, a third upright portion, and a fourth upright portion, wherein the antenna is formed from the first upright portion and the second upright portion.

19. The computing module of claim 18, wherein the fourth upright portion has slots defined therein.

20. The computing module of claim 15, further comprising a connector electrically coupled to the circuit element assembly, the connector configured to be electrically coupled to an external antenna comprising an external coaxial cable.

21. A wearable computing system, comprising:
a computing module, including:
a case having a bottom portion and a plurality of lateral sidewalls, the case defining an enclosure;
an optical display subsystem coupled to the case;
a circuit element assembly positioned within the enclosure and coupled to the optical display subsystem;
a power cell coupled to the circuit element assembly; and
a plurality of case engagement features operatively associated with the case; and
a wearable carrier including:
a body defining a carrier recess, the carrier recess configured to allow the computing module to be received at least partially therein to removably couple the computing module to the wearable carrier; and
a plurality of carrier engagement features configured to engage the case engagement features.

22. The wearable computing system of claim 21, wherein the case engagement features include a plurality of detents defined in opposing lateral sidewalls and the carrier engagement features include protrusions configured to engage respective detents.

23. The wearable computing system of claim 22, wherein the protrusions comprise ball-type members, the carrier engagement features further including resilient members configured to bias the ball-type members outwards to engage respective detents.

24. The wearable computing system of claim 23, wherein the wearable carrier further comprises:
a plurality of adjustment screws accessible from exterior surfaces of the body, each configured to adjust a magnitude of an outward bias force exerted by a respective resilient member on a respective ball-type member; and
a strap coupled to the body so as to obscure the adjustment screws from view.

25. The wearable computing system of claim 22, further comprising grooves defined in the opposing lateral sidewalls, the grooves being used in conjunction with the detents.

26. The wearable computing system of claim 21, wherein the case engagement features and the carrier engagement features include magnetically sensitive areas.

27. The wearable computing system of claim 21, wherein the case engagement features includes a post extending outward from one of the lateral sidewalls.

28. The wearable computing system of claim 27, further comprising an audio connector associated with the circuit element assembly, wherein the post is configured to couple the audio connector to an external audio device.

29. The wearable computing system of claim 21, wherein the wearable carrier includes an external button and the computing module includes a flush button configured to align with the external button when the computing module is removably coupled to the wearable carrier, and wherein the external button is configured to exert an inward force on the flush button.

30. The wearable computing system of claim 29, wherein the flush button is configured to cause the computing module to activate a particular function in response to the inward force.

31. The wearable computing system of claim 30, wherein the particular function activated by the computing module depends on a pattern and duration of the inward force.

32. The wearable computing system of claim 30, wherein the particular function activated by the computing module includes backlight control, sleep control, reset, activation of a particular subsystem of the computing module, or deactivation of a particular subsystem of the computing module.

33. A wearable carrier comprising:
a body defining a carrier recess configured to at least partially receive a computing module so as to removably couple the computing module to the wearable carrier, the body including two opposing base members and two opposing sidewalls interposed between the two opposing base members;
a recess defined in each of the two opposing sidewalls; and
a plurality of carrier engagement features configured to engage corresponding computing module engagement features included in the computing module, each of the plurality of carrier engagement features being at least partially disposed in a respective one of the recesses defined in each of the two opposing sidewalls.

34. The wearable carrier of claim 33, wherein each of the plurality of carrier engagement features comprises a spacer layer and a bumper and the computing module engagement features include detents formed in sidewalls of the computing module.

35. The wearable carrier of claim 34, wherein each of the spacer layers includes cellular urethane foam or poron.

* * * * *